J. D. WRIGHT,
Assignor to WHITELEY, FASSLER & KELLY.
MEANS FOR ADJUSTING THE GRAIN-WHEELS OF HARVESTERS.
No. 7,410. Reissued Nov. 28, 1876.
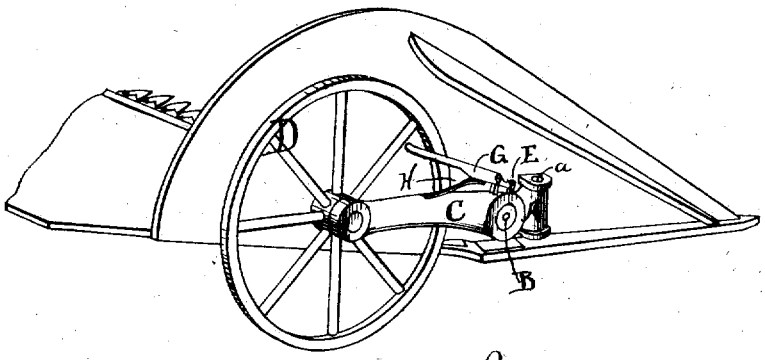
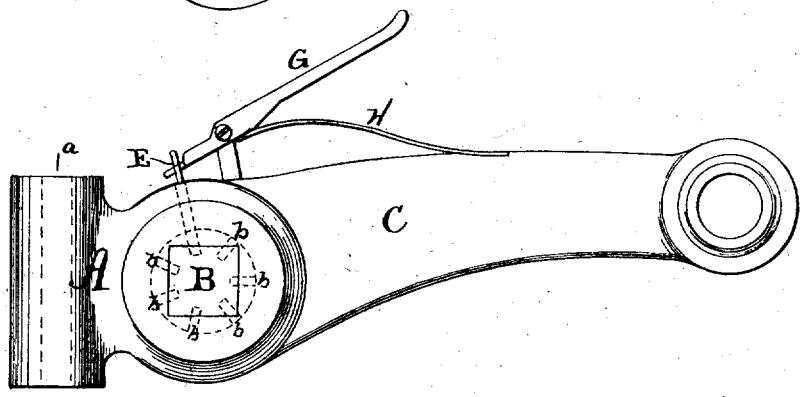
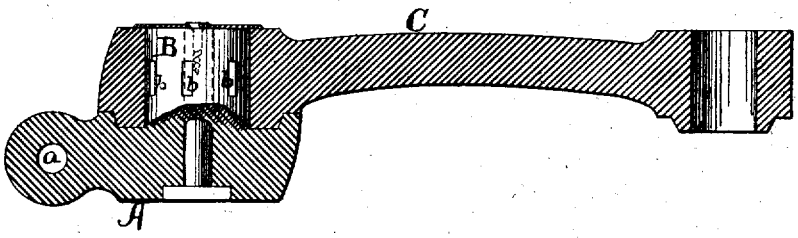
Attest:
C. Clarence Poole
D. P. Cowl
Inventor:
James D. Wright
By his atty
R. H. Smith.
THE GRAPHIC CO. N.Y.

UNITED STATES PATENT OFFICE.

JAMES D. WRIGHT, OF COLUMBIA, TENNESSEE, ASSIGNOR TO WHITELEY, FASSLER & KELLY.

IMPROVEMENT IN MEANS FOR ADJUSTING THE GRAIN-WHEELS OF HARVESTERS.

Specification forming part of Letters Patent No. 109,481, dated November 22, 1870; reissue No. 7,410, dated November 28, 1876; application filed August 23, 1876.

*To all whom it may concern:*

Be it known that I, JAMES D. WRIGHT, of Columbia, in the county of Maury and State of Tennessee, have invented a new and Improved Means for Adjusting the Grain-Wheels of Harvesters; and I do hereby declare that the following is a full and clear description of the same, reference being had to the accompanying drawings, wherein—

Figure 1 is a perspective view, showing my improvements in operative position. Fig. 2 is a side elevation of the same. Fig. 3 is a horizontal section of same.

The object of my invention is to facilitate the adjustment of the grain-wheel and outer end of the cutting apparatus, as to its distance from the ground, by an apparatus which requires the use of one hand only; and to this end my invention consists in a latch operated by a hand-lever mounted upon one part of the grain-wheel arm, and engaging with one of a series of notches in a peripheral rack on the other of said parts, so that the same may be used to adjust the cutter-bar to any desired height from the ground.

That others may fully understand my improvement, I will particularly describe it in the form shown in the accompanying drawing.

A is a hinged plate, which is attached to the outer end of the cutting apparatus by means of a vertical pivot-bolt, *a*. To this hinged plate the arm C is pivoted by means of a horizontal pivot, B, upon which the parts A and C of the grain-wheel arm have a relative movement in a vertical plane, and the outer end of the cutting apparatus may be maintained at any desired height from the ground. The grain-wheel D is attached to the outer end of the arm C by a horizontal axle-bolt, in the usual way.

The hinged plate A and arm C, being jointed together and relatively movable in a vertical plane, have heretofore been provided with a coupling-pin, which was inserted through corresponding holes in said arm and plate, and any readjustment of said arm requires the support of the outer end of said cutting apparatus by some power, while the coupling-pin is withdrawn and reinserted by another power. In practice this involves the employment of both hands—an inconvenience which is removed by my improvement. I therefore make a notched rack on one of the parts of said arm, usually the plate A, and attach to the other of said parts a latch, operated by a thumb or hand lever, to engage with the notches of said rack, and hold said parts A and C in adjustment, as desired.

As shown in the drawings hereto attached, the rack is formed by the notches *b b* in the axial pivot B, and the latch E is mounted upon the arm C, to engage with one or another of said notches. The latch E is controlled by a thumb or hand lever, G, and the spring H, both mounted upon the arm C.

Operation: When the adjustment of the grain-wheel D is to be changed, the operator places his hand beneath the arm C, near to the joint B, and with his thumb depresses the lever G, to withdraw the latch E. When said latch has been withdrawn, the outer end of the cutting apparatus may be raised or lowered, as desired, and the latch E again released, when the proper adjustment has been attained.

Having described my invention, what I claim as new is—

The hinged plate A and arm C, joined together by a pivot-bolt, B, combined with a latch-bolt, E, and hand-lever G, located upon one of said parts, and engaging with a notched rack upon the other of said parts, for the purpose of holding said arm C and the grain-wheel in any desired adjustment, as set forth.

In testimony that I claim the above, witness my hand.

JAMES D. WRIGHT.

Attest:
S. H. HOLCOMB,
H. C. MOORE.